No. 716,343. Patented Dec. 16, 1902.
F. M. LOCKE.
MACHINE FOR FORMING THE INTERIOR OF PLASTIC MATERIALS.
(Application filed May 8, 1901.)
(No Model.)
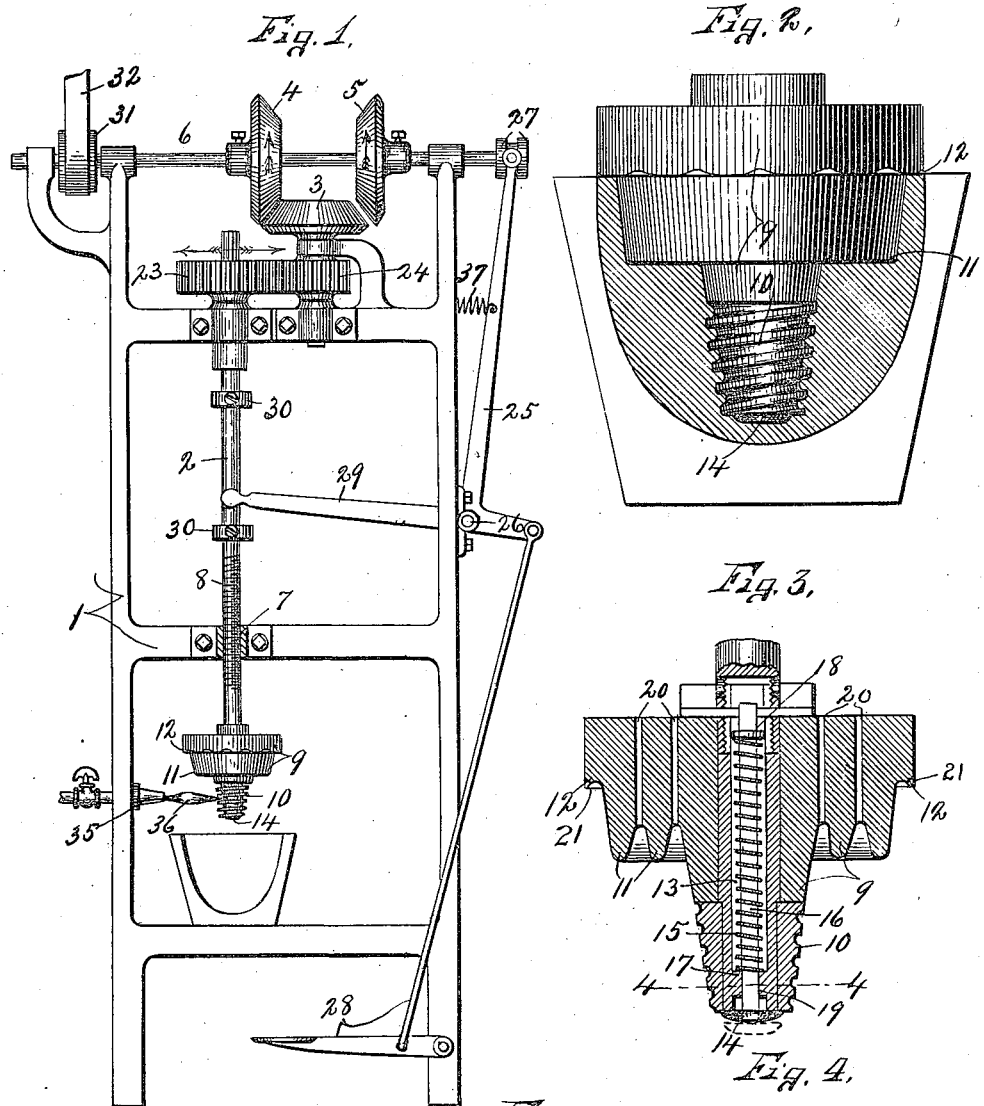
WITNESSES:
INVENTOR
Fred M. Locke
BY Smith & Denison
ATTORNEYS.

UNITED STATES PATENT OFFICE.

FRED M. LOCKE, OF VICTOR, NEW YORK.

MACHINE FOR FORMING THE INTERIOR OF PLASTIC MATERIALS.

SPECIFICATION forming part of Letters Patent No. 716,343, dated December 16, 1902.

Application filed May 8, 1901. Serial No. 59,289. (No model.)

*To all whom it may concern:*

Be it known that I, FRED M. LOCKE, of Victor, in the county of Ontario, in the State of New York, have invented new and useful Improvements in Machines for Forming the Interior of Plastic Materials, of which the following, taken in connection with the accompanying drawings, is a full, clear, and exact description.

This invention relates to improvements in machines for forming the interior contour of articles manufactured from porcelain or similar material and which are molded while the material from which the articles are made is in the plastic state.

In the manufacture of insulators from porcelain a high grade of porcelain is required to withstand puncturing by high-voltage currents; otherwise the insulator is of but very little, if of any, value.

In the manufacture of porcelain insulators two processes or methods are known and used. One is known as the "dry process," and which consists in mixing the dust with just moisture enough to allow the material after it has been subjected to high pressure to hold its shape by judicious handling. The other method is known as the "wet process," and consists in mixing the material with sufficient water to make it plastic. By the dry process I am able to make an article of almost any form desirable; but the body is not homogeneous throughout, owing to the fact that one portion of the body will be pressed more than another and the further reason that no amount of pressure will compress the particles in this semidry state as closely together as they originally were in the natural state or as closely together as if they were compressed in a plastic condition.

Porcelain such as made by the dry process is good for some purposes, but not very valuable for insulators which are required to conduct high voltage or even ordinary voltage, for the reason, as above set forth, the porcelain will not be dense or homogeneous enough, it remains too porous, and it is easily punctured by the electric current.

Very dense porcelain can be manufactured by the wet process; but the difficulty experienced in the manufacture of insulators by the wet process is that where an interior thread is required or where downwardly-extending petticoats are required to be formed it has been impossible to form this interior thread, petticoats, or contour without taking great pains and consuming much time by experienced workmen to withdraw the die so as to maintain a perfect thread and at the same time have it maintain a perfect position within the insulator, owing to the plastic condition of the material, which causes the die to stick, and this adds greatly to the expense of the manufactured article. I have, however, found that all of these obstacles can be obviated in the wet process by first operating a heated die by rotation into the plastic material and out of it, and consequently by so constructing the die that as soon as it begins to withdraw air is admitted to the bottom of the die, and thereby prevents the vacuum which ordinarily causes the clay to stick to the die and deform the interior surface of the plastic material.

My object therefore is to construct a machine by which I am able to give the insulator or other device manufactured of porcelain by a wet process the form of a thread or other form, as may be required for the work in hand, and instantly withdraw the same without loss of time and without the use of expensive help and which shall operate automatically and may be manipulated by cheap labor, thereby reducing the cost of manufacture.

To this end my invention consists in the several new and novel features of construction and operation which are hereinafter more fully described, and set forth in the claims hereunto annexed.

In the accompanying drawings I have shown means for heating the dies and also for admitting air into the interior and beneath the die; but I do not limit myself to this particular mechanism, as it will be evident that the die may be heated mechanically by a hot blast or by an electric current or by a steam-pipe or any other well-known means. It will also be observed that the air may be admitted to the interior of the mold and beneath the die by means other than that shown herein.

Referring to the drawings, Figure 1 is an elevation of a machine for carrying out the objects of my invention. Fig. 2 is an elevation of the detached plunger for forming the threads and petticoats in a body of plastic material which is shown in section and supported in a suitable mold. Fig. 3 is a vertical sectional view through the die, showing the air-inlet valve in its normal closed position. Fig. 4 is a detail sectional view taken on line 4 4, Fig. 3. Fig. 5 is an inverted plan view of the die seen in Figs. 2 and 3.

Similar reference characters indicate corresponding parts in all the views.

In illustrating the operation of my invention I have shown a frame 1, upon which is mounted a revoluble spindle 2, connected to a cone 3, which is driven in reverse directions by oppositely-arranged cones 4 and 5, mounted on a driving-shaft 6. The frame 1 may be of any desired form or size and is provided with a threaded bearing 7, which is engaged by a threaded portion 8 of the spindle 2. The lower end of this spindle 2 is provided with a die 9, having a threaded plunger 10 and one or more concentric ribs 11 and 12, the plunger 10 serving to form the threaded portion of the insulator and the ribs 11 and 12 serving to form the petticoats of said insulator. This die 9 is provided with an air-passage 13, extending through the lower face of the threaded plunger 10, and is provided with a suitable valve 14, normally closing the air-passage and adapted to be opened automatically by suction or otherwise at the beginning of the upward or return movement of the plunger from the plastic material for the purpose of admitting air to the threaded socket of the plastic material, thereby equalizing the pressure within said socket and permitting the plunger to be readily withdrawn without adhering to the material. The rotary motion and taper of the threaded portion of the plunger serves to press the material into a compact homogeneous mass of uniform density and produces a more perfect insulator than could be produced with a straight rotary plunger or by direct compression of the material upon a fixed threaded plunger.

The valve 14 is held in its normal closed position by a spring 15, encircling the valve-stem 16 and interposed between the shoulder 17, provided on the plunger 9, and a shoulder 18, secured to the upper end of the valve-stem. This valve-stem 16 is guided in a circular opening 19 and is preferably of angular cross-section, as seen in Fig. 4, or the stem may have a slotway in one side for the purpose of permitting the passage of air to the lower surface of the plunger 9. The upper portion of the die 9 is also provided with a series of air-passages 20, which are shown as alined with the spaces between the ribs 11; but it is evident that these air-openings may be otherwise arranged and that, if desired, other openings may be formed in the die and alined with the ribs 11. The outer rib 12 is provided with a series of spiral cut-outs 21 for forming cutting-shoulders 22 and allow the superfluous clay to be thrown out, which serve to trim the edges of the plastic material and produce a smooth and finished surface to the outer edge of the insulator. This die is adapted to be rotated in reverse directions into and out of the body of the plastic material for forming the threads and other contours in said body. The means for effecting this reverse movement into and out of the plastic material consists of the friction-cones 3, 4, and 5 and the threaded portion 8 of the spindle 2, the threads 8 being of substantially the same pitch as the threads of the plunger 10 in order that the threaded plunger may be moved into and out of the plastic material without stripping or otherwise injuring the threads formed therein.

The spindle 2 is provided at its upper end with a suitable gear 23, which is feathered on the spindle and meshes with a pinion 24, connected to the shaft of the cone 3, whereby as the cone is rotated in either direction, the spindle 2 and die 9 are also correspondingly rotated in reverse directions.

The cones 4 and 5 are secured to the shaft 6 in such manner that when one of the cones is engaged with the cone 3 the other is out of engagement therewith, the shaft 6 being adapted to be moved endwise for forcing one or the other of the cones 4 and 5 into frictional engagement with the cone 3, whereby the spindle 2 may be rotated in either direction. This endwise movement of the cones 4 and 5 into and out of engagement with the cone 3 may be effected by any desired mechanism, here shown as consisting of a lever 25, pivoted to the frame at 26 and having one end adapted to engage a grooved collar 27 upon the shaft 6 and its other end connected to a suitable foot-lever or other shifting device 28, which is also pivoted on the frame and may be readily actuated by the operator for forcing one of the driving-cones 4 or 5 into engagement with the cone 3. This lever or pedal 28 is connected to the arm 25 in such manner that by depressing the pedal 28 the driving-cone 4 is forced into contact with the cone 3 for rotating the spindle 2, which simultaneously screws the plunger 10 into the plastic body.

One of the essential features of this invention is that the operation of the die 9 and plunger 10 into and out of the plastic material is entirely automatic, it being desirable, and even necessary, that immediately upon the formation of the threads and other contours in the plastic material the spindle 2 will be automatically rotated in a reverse direction for withdrawing said die from the mold. For this purpose I provide the lever 25 with an arm 29, projecting into the path of suitable collars 30, which are secured to the spindle 2 in such relation to the free end of the arm 29 that when the die reaches the limit of its downward movement during its rotation in one direction the upper collar 30 will automatically engage the arm 29 and thereby force the other cone 5 into engagement with the cone 3 for reversing the direction of movement of the cone 3, and thereby reversing the movement of the screw-threaded spindle 2 and elevating the die out of the plastic material without injury to the threads or other contours previously formed in said plastic material. The lower collar 30 is also so relatively arranged to the arm 29 that when the spindle is withdrawn from the plastic material the arm 29 is rocked upwardly, thereby forcing the cone 5 out of engagement with the cone 3 and preventing further rotation of the spindle 2, a spring 37 being connected to the frame 1 and lever 25 for normally holding the arm 29 in engagement with the lower stop 30, so that neither of the cones 4 or 5 can operate the cone 3 until the pedal 28 is first depressed.

The driving-shaft 6 may be connected to any source of power, (not necessary to illustrate,) being provided with a pulley 31 and a belt 32 for this purpose.

Any desired means may be employed for uniformly heating the die 9 or threaded portion 10 and its valve 14 during their rotation, and I have herein shown a gas-burner 35 as directing a flame 36 against the lower portion of the die. By thus heating and simultaneously rotating the parts which come in contact with the plastic material it is apparent that when said parts are forced into the plastic material the heat radiating therefrom causes the adjacent surface of the plastic material to shrink away from the same, and therefore prevents the adhesion of the plastic material to the die and permits the same to be readily withdrawn without injuring the threads or other contours formed in the plastic material and at the same time makes a more homogeneous and compact insulator. It is evident, however, that any other means may be employed for heating the die, either by steam, electricity, or hot air.

In the operation of my invention the pedal 28 is first depressed, as seen in Fig. 1, to rock the lever 25 for forcing and holding the cone 4 in engagement with the cone 3 for rotating the spindle 2, and thereby screwing the die 9 and plunger 10 downwardly into the plastic material. When the die has reached the limit of its downward movement sufficient to form a perfect thread and the desired contour, the upper collar 30 automatically engages the arm 29, thereby shifting the position of the shaft and forcing the other cone 5 into engagement with the cone 3, which rotates the spindle in the reverse direction and at the same time screws the spindle upwardly for moving the plunger out of the plastic material and elevates the pedal, it being understood that if the pedal 28 were released at any time during the descent of the plunger when the lever-stop 30 is withdrawn from the arm 29 the spring 37 immediately draws the arm 25 inwardly and forces the cone 5 into engagement with the cone 3 to return the plunger to its normal position.

Although I have described the specific form of operating mechanism for rotating the plunger and moving the same into and out of the die at the same rate of speed, it will be evident that any other equivalent means may be employed for this purpose. Therefore I do not limit myself to the precise construction and arrangement shown and described—as, for instance, the gears 23 and 24 may be dispensed with and the spindle 2 may be driven directly from the cones 4 and 5.

Having thus fully described my invention, what I claim as new, and desire to secure by Letters Patent, is—

1. A machine for forming the interior contour in plastic material, consisting of a rotary tapering plunger having a valved inlet for the air adapted to be rotated into and out of the plastic material for the purpose of giving shape thereto, means for operating said plunger and means to heat the plunger as it moves into and out of the material.

2. A machine for forming the interior contour in plastic material, consisting of a rotary plunger having a valved inlet for the air adapted to be rotated into and out of the plastic material for the purpose of giving shape thereto, means for heating said plunger during its rotation and means for operating the same.

3. A machine for forming threads in plastic material consisting of a rotary threaded plunger having an air-inlet opening and adapted to be screwed into and out of the plastic material for forming threads therein, a normally closed valve for the opening, said valve being rotated with the plunger and automatically opened as the plunger is withdrawn from the plastic material, and means for heating the plunger.

4. A machine for forming threads in plastic material consisting of a threaded rotary plunger having a lengthwise air-passage and a normally closed valve for the passage adapted to rotate with the plunger, and mechanism for rotating the plunger in reverse directions and simultaneously screwing the same into and out of the plastic material for the purpose set forth and means for heating the plunger.

5. A screw-threaded spindle carrying a threaded tapering plunger having a valved inlet for the air therein, in combination with a threaded bearing engaged with the threads of the spindle, and means for rotating the spindle in reverse directions and means to heat the plunger for the purpose set forth.

6. A machine for forming threads in plastic material comprising a threaded bearing, a threaded spindle screwing into the bearing and provided with a tapering plunger having threads of substantially the same pitch as the threads on the spindle, and means to rotate the spindle in reverse directions to screw the plunger into and out of the plastic material, said plunger having an air-passage, a valve rotating with the plunger, and means to heat the valve and plunger.

7. A machine for forming the interior contour in plastic material consisting of a rotary former having an annular flange provided with grooves or cut-outs for permitting the discharge of the superfluous material during the rotation of the former, said former being adapted to be forced into and out of the plastic material.

8. A machine for forming the interior contour of plastic material comprising a rotary former having an annular groove and an air-passage communicating with the groove and means for forcing the former into and out of the plastic material.

9. A machine for forming the interior contour in plastic material, consisting of a tapering rotary plunger adapted to be rotated into and out of the plastic material to give shape thereto, said plunger having a valved inlet for the air therein, means for operating the plunger and additional means to heat the tapering portion of the plunger during its rotation.

10. A machine for forming threads in plastic material, consisting of a threaded tapering plunger adapted to be screwed into and out of the plastic material for forming threads therein, said plunger having a valved inlet for the air, and means to heat the plunger for the purpose set forth.

11. A machine for forming threads in plastic material consisting of a threaded tapering plunger having an air-inlet opening, a valve for the purpose described, means for screwing the plunger into and out of the plastic material to form threads therein, and additional means to heat the plunger.

12. A machine for forming the interior contour in plastic material, consisting of a rotary plunger adapted to be forced into and out of the plastic material and having an air-inlet opening, a valve for said opening rotating with the plunger and means to heat the plunger.

13. A machine for forming the interior contour in plastic material, consisting of a rotary plunger adapted to be forced into and out of the plastic material and having an air-passage, a valve for said passage rotating with the plunger, means to operate the plunger and additional means to heat the valve.

14. A machine for forming the interior contour in plastic material, consisting of a plunger adapted to be rotated into and out of the plastic material and having an air-passage, a valve for said passage, and means to heat the valve and plunger.

15. A machine for forming threads in plastic material consisting of a threaded tapering plunger adapted to be screwed into and out of the plastic material for forming threads therein, said plunger having an air-opening and a valve for the purpose described, and means to heat the valve.

In witness whereof I have hereunto set my hand this 1st day of May, 1901.

FRED M. LOCKE.

Witnesses:
F. E. COBB,
W. A. HIGINBOTHAM.